United States Patent

Ueyama et al.

[11] Patent Number: 5,999,752
[45] Date of Patent: Dec. 7, 1999

[54] EXPOSURE CONTROLLER FOR USE IN A CAMERA

[75] Inventors: Masayuki Ueyama, Takarazuka; Masayuki Miyazawa, Kawachinagano; Shigeaki Tochimoto, Kyoto; Junichi Tanii, Izumi, all of Japan

[73] Assignee: Minolta Co., Ltd., Osaka, Japan

[21] Appl. No.: 09/090,239

[22] Filed: Jun. 4, 1998

[30] Foreign Application Priority Data

| Jun. 5, 1997 | [JP] | Japan | 9-147772 |
| Jun. 5, 1997 | [JP] | Japan | 9-147889 |
| Jun. 5, 1997 | [JP] | Japan | 9-147890 |

[51] Int. Cl.⁶ .................................................. G03B 7/00
[52] U.S. Cl. .................... 396/213; 396/170; 396/227; 396/235
[58] Field of Search .................................. 396/170, 213, 396/227, 235

[56] References Cited

U.S. PATENT DOCUMENTS

| 4,782,353 | 11/1988 | Ogihara et al. | 396/213 |
| 4,929,977 | 5/1990 | Ishikawa et al. | |
| 4,972,217 | 11/1990 | Gaewsky | 396/235 |
| 4,984,003 | 1/1991 | Matsumoto et al. | 396/213 |
| 5,014,082 | 5/1991 | Farrington | 396/235 |
| 5,140,362 | 8/1992 | Morino et al. | 396/213 |
| 5,172,158 | 12/1992 | Morino et al. | 396/235 |
| 5,245,380 | 9/1993 | Yang | 396/235 |

FOREIGN PATENT DOCUMENTS

| 1-316726 | 12/1989 | Japan . |
| 4-215633 | 8/1992 | Japan . |
| 6-160933 | 6/1994 | Japan . |

*Primary Examiner*—Russell Adams
*Attorney, Agent, or Firm*—Burns, Doane, Swecker & Mathis, LLP

[57] ABSTRACT

An exposure controller for use in a photographing apparatus including a flash, includes a diaphragm having a changeable opening to adjust the amount of light reaching a photosensitive medium from a lens optical system, a diaphragm control unit for changing the opening of the diaphragm during the time when a shutter is being opened, and a flash control unit for firing the flash at a predetermined time during the time when the shutter is being opened. This exposure controller enables photography having apodization effect.

28 Claims, 13 Drawing Sheets

OPENING DIAMETER OF DIAPHRAGM

DRIVE PULSE NUMBER

EXPOSURE CONTROLLER FOR USE IN A CAMERA

This application is based on patent application Nos. 9-147772, 9-147889, and 9-147890 filed in Japan, the contents of which is hereby incorporated by reference.

BACKGROUND OF THE INVENTION

This invention relates to an exposure controller for a camera capable of obtaining a special picture effect by changing an opening area of a diaphragm while a film is being exposed, i.e., a shutter is open.

Generally, a camera is provided with a diaphragm for restricting the amount of light reaching a film after passing a lens optical system and a shutter for causing the film to be exposed by opening for a set exposure time in order to properly expose the film. The opening area of the diaphragm and the shutter speed are factors largely influencing how pictures will turn out and are closely related to an occurrence of blurredness and a camera shake.

A lens shutter is a shutter which is provided in the lens optical system and in which the same blades are generally used as aperture blades and shutter blades, i.e., acts as a diaphragm and as a shutter. Thus, the opening area and the shutter speed cannot be set independently of each other. Therefore, the opening area and the shutter speed are determined based on a light measurement value according to the specification of the camera.

On the other hand, in a single-lens reflex camera in which a lens is exchangeable, the diaphragm and the shutter are generally separate elements, and a focal plane shutter is provided as a shutter immediately before a film. In such a single-lens reflex camera, the opening area of the diaphragm and the shutter speed are manually or automatically set such that the film is suitably exposed according to the brightness of an object. During the photographing, the diaphragm is actuated to a specified aperture value and then the shutter is actuated with the opening area fixed.

For example, Japanese Unexamined Patent Publication No. 1-316726 discloses a camera system which includes a lens shutter and a focal plane shutter, and has a lens shutter mode for actuating the lens shutter as a program shutter and a focal plane shutter mode for controlling the aperture by the lens shutter and controlling the exposure time by the focal plane shutter.

According to this camera system, the aperture value changes over time in the case that a program exposure is made by the lens shutter. Thus, a moving direction of a moving body is recognizable based on the blurredness of an image resulting from an aperture effect.

There is also a commercially available camera which can obtain an effect approximate to an effect obtained when an apodization filter is used by actuating the lens shutter in accordance with a triangular exposure curve for opening the lens shutter at a relatively low speed and closing it at a high speed (hereinafter, "apodization effect") (see pp. 66 to 71, May, 1971 issue of "Shashin Kogyo (Photographic Industry)" published by the Photographic Industry Publishing Company). The apodization filter is constructed such that transmittance is reduced along a direction perpendicular to an optical axis away from the center of the optical axis. If a picture is taken using this apodization filter, there can be obtained an effect that an out-of-focus image is made softly blurry as a whole, thereby being turned into an image which renders a satisfactory blurry effect.

However, the apodization effect cannot be obtained in the conventional single-lens reflex camera since the aperture value is held at a specified value without being changed during the exposure.

Further, in the camera system disclosed in Japanese Unexamined Patent Publication 1-316726 and the camera which operates in accordance with the triangular exposure curve, a sufficient apodization effect or a desired apodization effect suited to a photographer's purpose cannot be obtained since the lens shutter opens at a specified speed as time elapses.

SUMMARY OF THE INVENTION

It is an object of the present invention to provide an exposure controller for camera which has overcome the problems residing in the prior art.

According to an aspect of the present invention, an exposure controller comprising: a diaphragm which has a changeable opening to adjust the amount of light reaching a photosensitive medium from a lens optical system; a shutter which is openable to permit the photosensitive medium to be exposed to light; and a control unit which changes the opening of the diaphragm during the time when the shutter is being opened.

According to another aspect of the present invention, an exposure controller comprising: a diaphragm which has a changeable opening to adjust the amount of light reaching a photosensitive medium from a lens optical system; a shutter which is openable to permit the photosensitive medium to be exposed to light; a changing manner setter which sets a changing manner of changing the opening of the diaphragm; and a control unit which changes the opening of the diaphragm in accordance with a set changing manner during the time when the shutter is being opened.

According to still another aspect of the present invention, an exposure controller for use in a photographing apparatus including a flash, comprising: a diaphragm which has a changeable opening to adjust the amount of light reaching a photosensitive medium from a lens optical system; a shutter which is openable to permit the photosensitive medium to be exposed to light; a diaphragm control unit which changes the opening of the diaphragm during the time when the shutter is being opened; and a flash control unit which fires the flash at a predetermined time during the time when the shutter is being opened.

According to yet still another aspect of the present invention, a photographing apparatus comprising: a lens optical system which introduces light from an object to a photosensitive medium; a diaphragm which has a changeable opening to adjust the amount of light reaching the photosensitive medium; a shutter which is openable to permit the photosensitive medium to be exposed to light; a control unit which changes the opening of the diaphragm during the time when the shutter is being opened.

These and other objects, features and advantages of the present invention will become more apparent upon a reading of the following detailed description and accompanying drawings.

BRIEF DESCRIPTION OF THE DRAWINGS

FIG. 2 is a timing chart showing operative states of elements of the camera after a preparatory switch is turned on;

DETAILED DESCRIPTION OF THE PREFERRED EMBODIMENTS OF THE INVENTION

Figure 7:
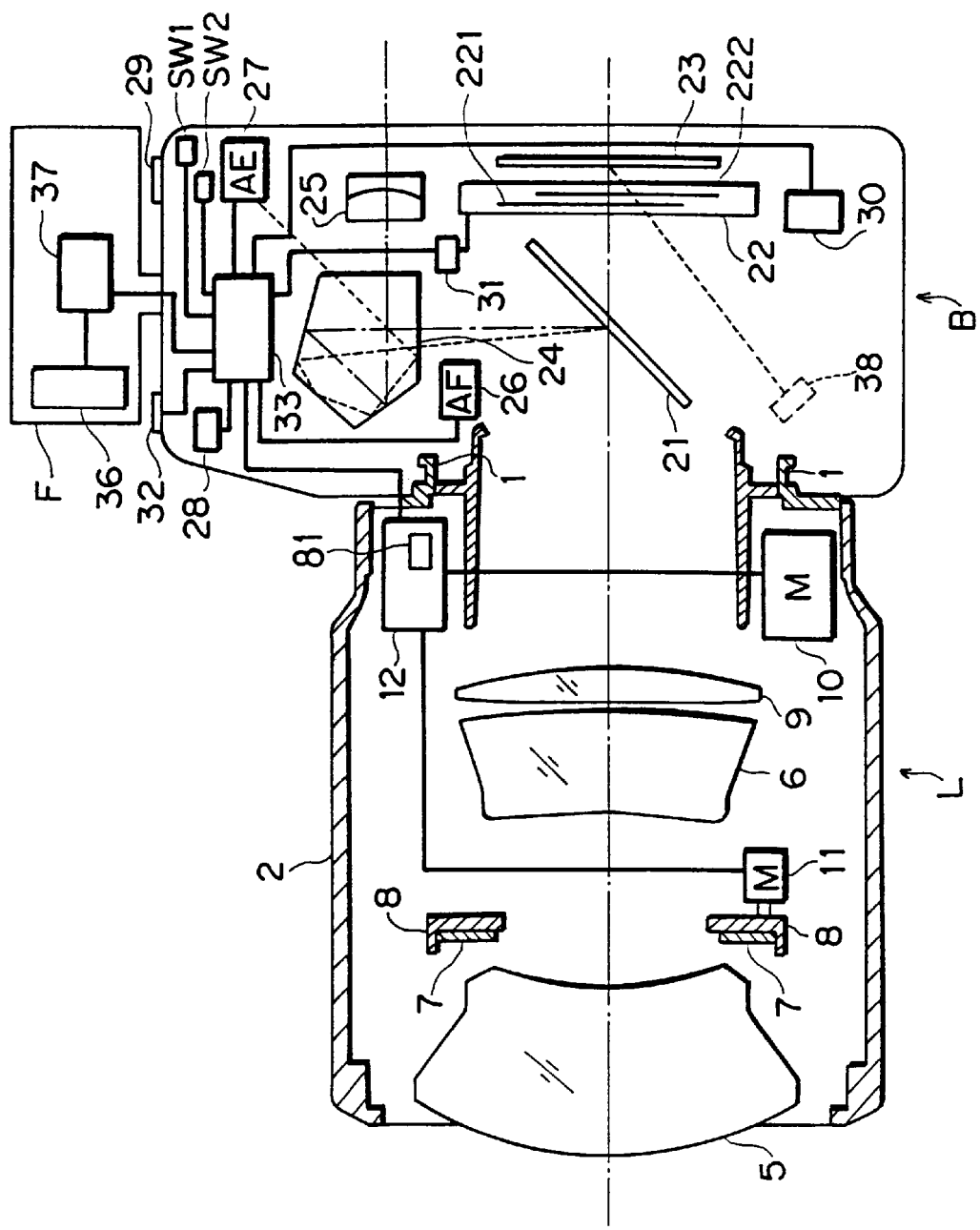
FIG. 7 is a schematic diagram showing an inner construction of the camera.

FIG. 7 is a schematic internal construction diagram of a camera embodying the invention.

This camera includes a lens unit L and a body unit B as shown in FIG. 7. The lens unit L is detachably mounted on a lens mount 1 provided on the body unit B, and an external flash F is mounted at the upper end of the body unit B.

The lens unit L is provided with a cylindrical focus cam ring (not shown) provided in proximity to the inner surface of a cylindrical barrel 2, a cylindrical fixed tube (not shown) provided in proximity to the inner surface of the focus cam ring, first and second movable frames 3, 4 (see FIG. 1) carried on the focus cam ring and the fixed tube, respectively, lenses 5, 6 supported on the first movable frame 3, a diaphragm 7, a support frame 8 for supporting the diaphragm 7, a lens 9 supported on the second movable frame 4, a focusing motor 10, a diaphragm drive motor 11 including a pulse motor, and a lens microcomputer 12 for controlling the respective elements of the lens unit L. This lens microcomputer 12 is internally provided with a ROM 81 for storing data set in advance such as an F-number at fully opened aperture (hereinafter, referred to as "full open F-number") of a lens optical system provided in the lens unit L.

The first and second movable frames 3, 4 are provided with unillustrated guide pins engageable with a linear groove formed in the fixed tube and a cam groove formed in the focus cam ring, respectively.

On the other hand, the body unit B is provided with a main mirror 21, a focal plane shutter (hereinafter, merely referred to as "shutter") 22 and a film 23 arranged in this order on an optical axis of the lens L, and a viewfinder optical system including a pentaprism 24 and an eyepiece lens 25 provided in an upper portion. The main mirror 21 is inclined at 45° with respect to the optical axis and introduces light beams having passed the lens unit L to the viewfinder optical system. The shutter 22 includes a front blind 221 and a rear blind 222. There is also provided a known quick return mirror mechanism (not shown) for retracting the main mirror 21 from a position shown in FIG. 7 immediately before the start of the exposure and returning it immediately after the completion of the exposure.

The body unit B is further provided with a distance meter (AF) 26 for performing a distance metering, a light meter (AE) 27 provided in a specified position above the eyepiece lens 25, a viewfinder display 28 including an LED or the like, a shutter release button 29 provided in a specified position on the outer surface of the body B, a preparatory switch SW1 which is turned on when the shutter release button 29 is partly pressed, a release switch SW2 which is turned on when the shutter release button 29 is further pressed while the preparatory switch SW1 is on, a film speed reader 30 for reading the sensitivity of the film 23, a shutter driver 31 for driving the front and rear blinds 221, 222 of the shutter 22 at specified times, an operation device 32 provided in a specified position on the outer surface of the body B and a body microcomputer 33 for controlling the respective elements of the body unit B.

With this construction, a part of the light introduced to the pentaprism 24 is incident on the light meter 27, and the brightness of an object is detected based on a light measurement value outputted from the light meter 27 to control the diaphragm 7.

Further, when the focusing motor 10 is rotated during the focusing, the focus cam ring is rotated and the first and second movable frames 3, 4 move, respectively by the presence of the guide pins engaged with the linear groove of the fixed tube and the cam groove of the focus cam ring. As a result, the lenses 5, 6 and the diaphragm 7 are projected as an integral unit and the lens 9 is independently projected to attain an in-focus condition.

Further, the external flash F includes a flash 36 and a flash firing circuit 37.

Figure 8:
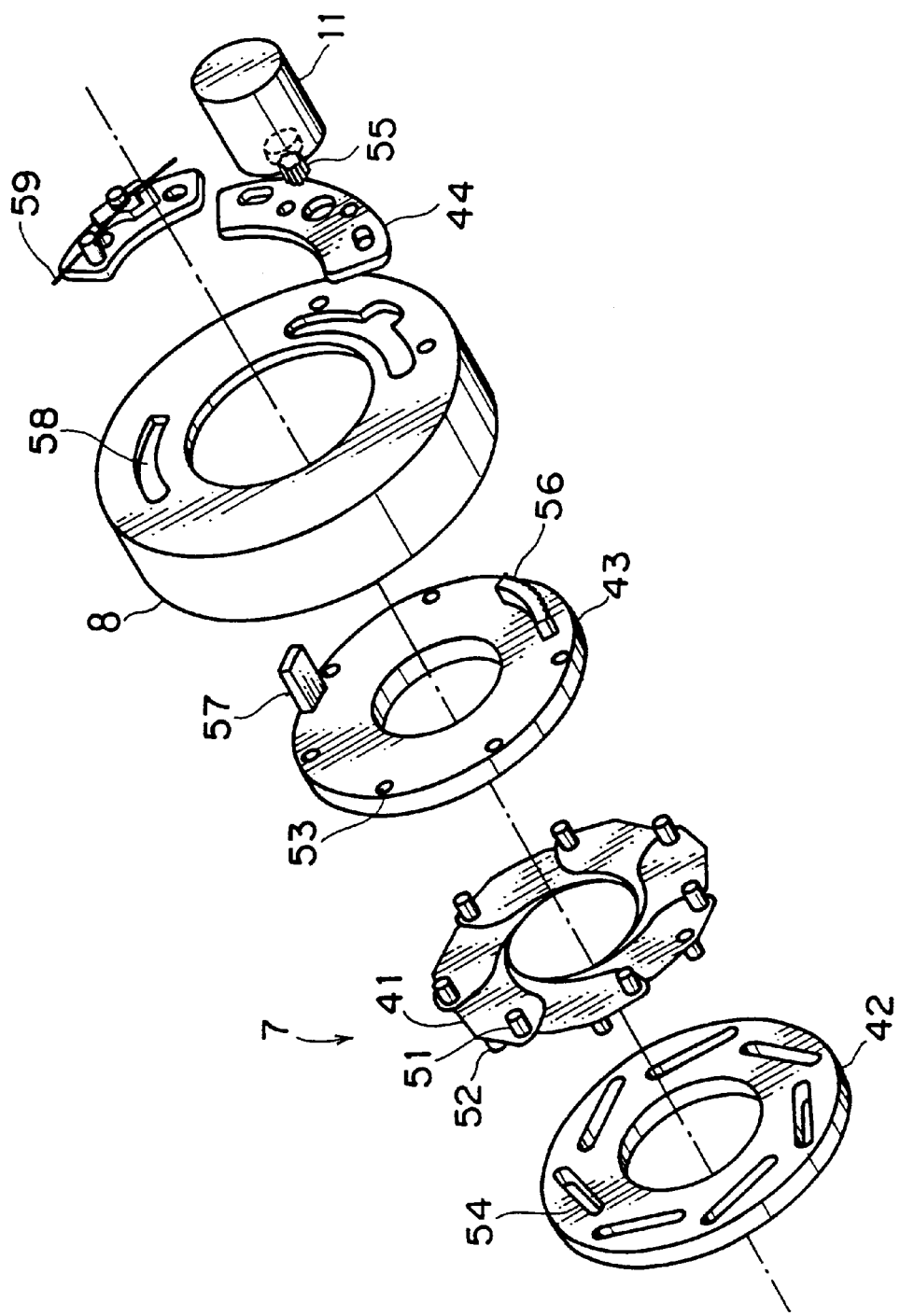
FIG. 8 is an exploded perspective view showing a diaphragm and a driver therefor in the camera.

FIG. 8 is an exploded perspective view showing the diaphragm 7 and a driver therefor. The diaphragm 7 is comprised of seven blades 41 as shown in FIG. 8, and the driver for actuating the diaphragm 7 is comprised of a pressing plate 42, an operating plate 43, the support frame 8, a motor base 44 and a diaphragm drive motor 11 from the left in FIG. 8. The pressing plate 42 is fixedly supported on the support frame 8 and the operating plate 43 is rotatably supported thereon.

Each blade 41 has a pin 51 projecting on one surface thereof (right side in FIG. 8) and a pin 52 projecting on the other surface (left side in FIG. 8). The pin 51 is fittable into a hole 53 formed in the operating plate 43, whereas the pin 52 is fittable into a guide groove 54 formed in the pressing plate 42.

The diaphragm drive motor 11 is mounted on the support frame 8 while being supported on the motor base 44 such that a gear 55 secured to a rotatable shaft thereof is meshable with a rack 56 formed on the operating plate 43.

With this construction, upon the transmission of the torque of the diaphragm drive motor 11 to the rack 56, the operating plate 43 is turned about the optical axis and the pins 51 rotate as the operating plate 43 is turned. On the other hand, the angles of the blades 41 change because the pins 52 move along the guide grooves 54 and, therefore, the opening area of the diaphragm 7 defined by the blades 41 changes.

A lever 57 provided on the operating plate 43 is fitted in a guide groove 58 formed in the support frame 8 and is so constructed as to come into contact with a spring 59 when the diaphragm 7 is opened. The opened state of the diaphragm 7 is detected by the movement of the spring 59.

Figure 9:
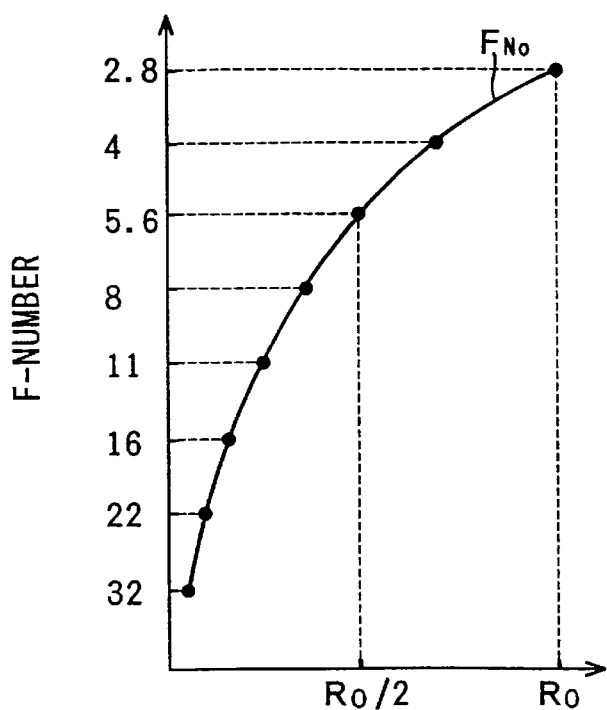
FIG. 9 is a graph showing an F-number in relation to an opening diameter of the diaphragm.
Figure 10:
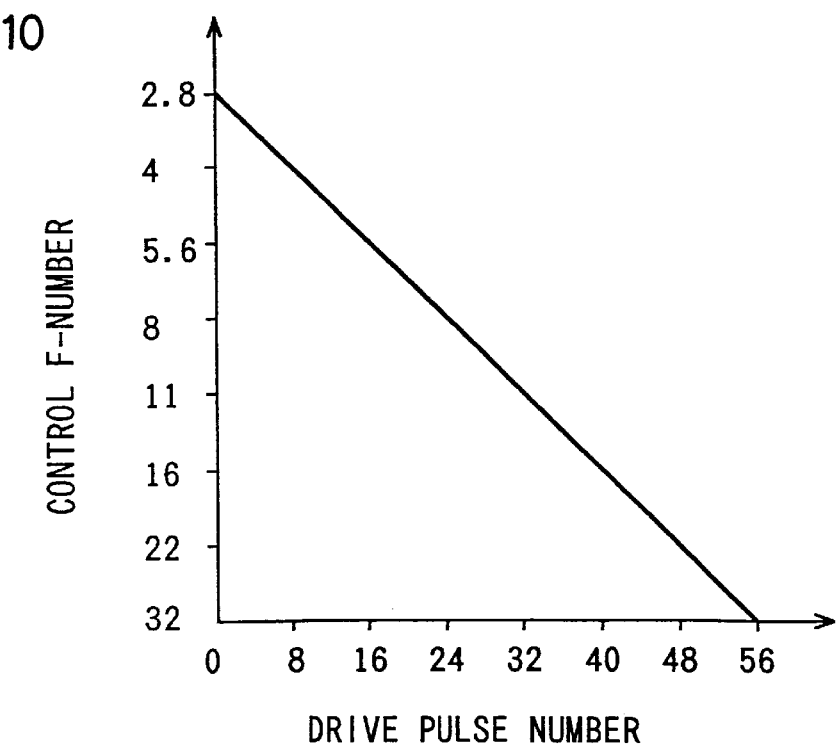
FIG. 10 is a graph showing a table data representing a control F-number in relation to a drive pulse number of a diaphragm drive motor when the diaphragm is actuated.

Next, the F-number is described with reference to FIGS. 9 and 10. FIG. 9 is a graph showing an F-number in relation to an opening diameter of the diaphragm 7, and FIG. 10 is a graph showing a table data representing a control F-number in relation to a drive pulse number of a diaphragm drive motor when the diaphragm is actuated. It should be noted that $R_0$ in FIG. 9 denotes an opening diameter when the diaphragm 7 is fully opened.

An F-number is a quantitative value of the brightness of the lens optical system and the aperture value and is determined by a focal length and an effective maximum diameter of the lens optical system as seen in Equation (1). This embodiment is constructed such that the F-number is 2.8 when the diaphragm 7 is fully open and the diaphragm opening can be reduced in seven stages in exposure index, i.e., AV (aperture value) from an F-number 2.8 to an F-number 32 as shown in FIG. 9.

$$F_{No} = f/D \qquad (1)$$

where $F_{No}$, f, D denote an F-number, a focal length and an effective maximum diameter of the lens optical system.

In FIG. 10, if the diaphragm drive motor 11 is driven every 8 pulses from the full open F-number, the diaphragm opening is reduced in such a manner that the F-number changes 4, 5.6, . . . . Accordingly, the drive pulse number of the diaphragm drive motor 11 may be controlled at 24 pulses when the control F-number outputted from the body microcomputer 33 is 8.

Figure 1:
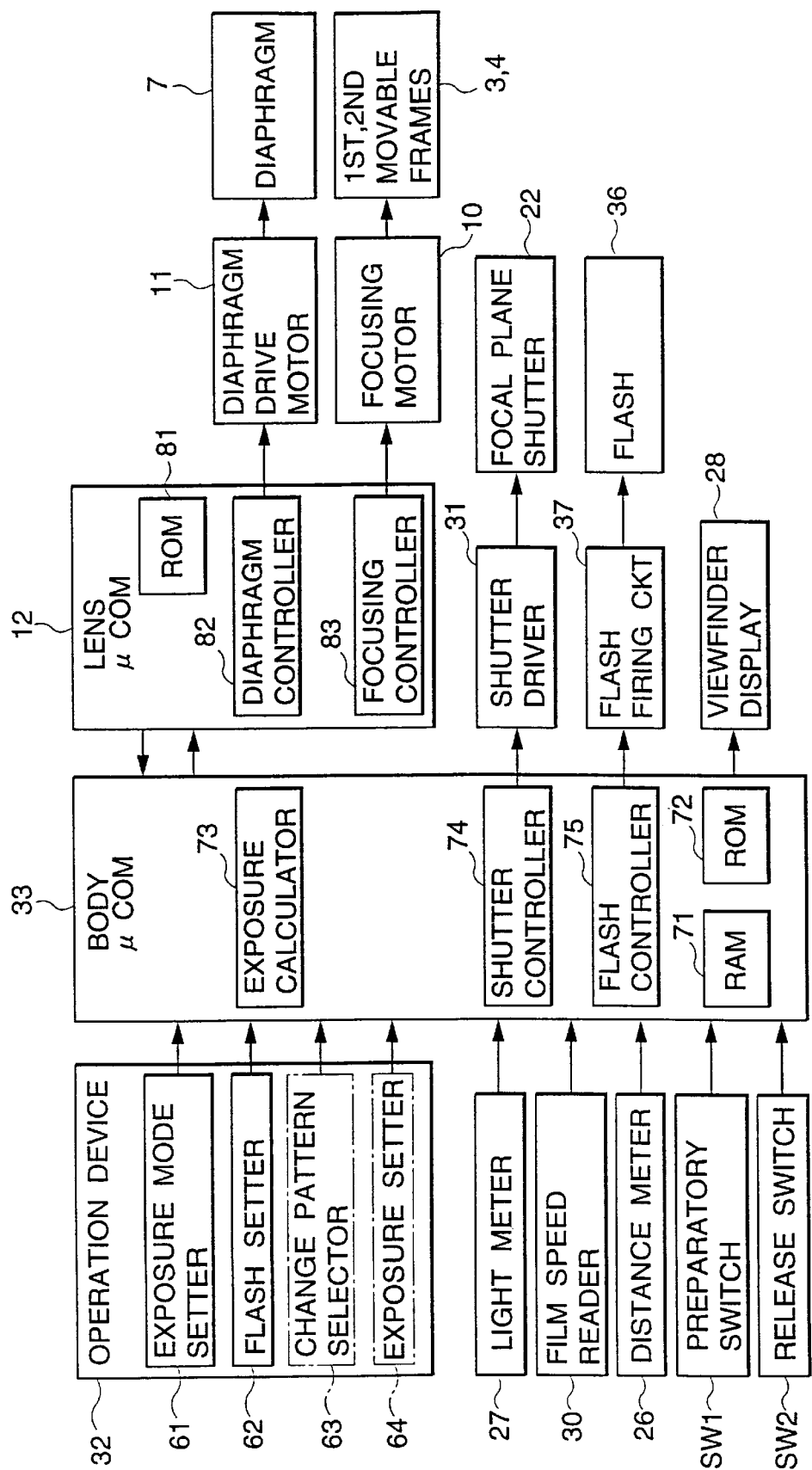
FIG. 1 is a block diagram showing a control construction of a camera embodying the present invention.

FIG. 1 is a block diagram showing a control construction of the camera. The operation device 32 is provided with an exposure mode setter 61 and a flash setter 62. The exposure mode setter 61 sets the exposure mode by selecting one of an apodization mode and a normal mode. The apodization mode is a mode for obtaining a photographic effect approximate to the one obtained when an apodization filter is used, i.e., an apodization effect.

The apodization filter is formed by adhering a concave lens made of an ND glass which is colored at a specified density to reduce transmittance and a convex lens made of a transparent glass, and has such a property that transmittance is reduced along a direction perpendicular to an optical axis from the center of the optical axis.

By using the apodization filter, the following photographic effects ① to ⑨ can be obtained since the light amount in a peripheral portion of an unsharp image is reduced.

① The density of an unsharp peripheral portion of a stationary object image is gradually reduced, with the result that a picture having a nice atmosphere in which blurredness is softened as a whole.

② An out-of-focus image is improved.

③ Spurious resolution does not occur.

④ A picture which is beautifully blurred and free from double line blurredness can be obtained.

⑤ An out-of-focus image is true to the original shape of an object.

⑥ Depth of field is improved when the full open F-number is equal.

⑦ Colors are unlikely to become unclear in unsharp object images having different colors.

⑧ Aberrations adversely affect an image to a less degree and a focused image is improved.

⑨ A flowing image of a moving object which is light at the start of an exposure and becomes denser toward the end of the exposure, thereby expressing a direction and a degree of the movement.

The flash setter 62 is adapted to set whether the flash 36 is to be fired or not.

The body microcomputer 33 is provided with a RAM 71, a ROM 72, an exposure calculator 73, a shutter controller 74 and a flash controller 75.

The RAM 71 is adapted to temporarily store data. The ROM 72 is adapted to store data set in advance such as a stop-down value $\Delta AV_0$ by which the opening of the diaphragm 7 is reduced from the full open F-number ($\Delta AV_0=3$ in this embodiment), a reference shutter speed $T_{S0}$ to be described later and a predetermined time T1 to be described later, and an opening reducing pattern of the diaphragm 7 in the apodization mode.

The exposure calculator 73 calculates a control F-number by adding the number of AV stops by which the diaphragm opening is to be reduced to the full open F-number using the brightness of the object detected from the light measurement value of the light meter 27 and also calculates the shutter speed $T_S$ in the normal mode. Further, in the apodization mode, the exposure calculator 73 calculates the shutter speed $T_S$ using the brightness of the object and the stop-down value $\Delta AV_0$.

In this embodiment, it should be noted that the shutter speed $T_S$ means a period of time when the shutter 22 is being fully opened while the exposure time $T_{SS}$ means a period of time when the shutter is being opened.

The shutter controller 74 controls the driving of the shutter 22 via the shutter driver 31 when the shutter release switch SW2 is turned on. The flash controller 75 causes the flash 36 to be fired via the flash firing circuit 37 at a time to be described later when the flash setter 62 is on.

The body microcomputer 33 also has the following functions ① to ⑦.

① To discriminate based on a standard to be described later whether the lens unit L mounted on the body unit B is a lens capable of performing the photographing in the apodization mode.

② To discriminate whether the switches SW1, SW2 are on or off.

③ To discriminate which exposure mode set by the exposure mode setter 61.

④ To determine a value of a predetermined time T2 as described later based on the obtained shutter speed $T_S$ when the apodization mode is set.

⑤ To count an elapsed time after the release switch SW 2 is turned on and discriminate whether the predetermined times T1, T2 have already elapsed.

⑥ To discriminate based on the obtained shutter speed $T_S$ whether the photographing in the apodization mode is possible when the apodization mode is set.

⑦ To perform controls to be described later such as a display of a warning on the viewfinder display 28 when the photographing in the apodization mode is discriminated to be impossible. It should be noted that the warning display on the viewfinder display 28 is made by turning the red LED on or blinking the LED.

The lens microcomputer 12 is provided with a ROM 81, a diaphragm controller 82 and a focusing controller 83. The ROM 81 is adapted to store data set in advance such as the full open F-number, the F-number at least opened aperture and the focal length of the lens optical system, a ratio of a defocus amount to a necessary lens projection amount, and a table data shown in FIG. 10 representing the drive pulse number of the diaphragm drive motor 11 when the diaphragm opening is reduced in relation to the control F-number.

The lens microcomputer 12 transmits the data stored in the ROM 81 to the body microcomputer 33. Further, the lens microcomputer 12 controls the drive pulse number of the diaphragm drive motor 11 in accordance with the control F-number transmitted from the body microcomputer 33. By this control, the operating plate 43 is rotated, thereby reducing the opening of the diaphragm 7 by a specified number of the AV stops from the fully opened state.

Figure 2:
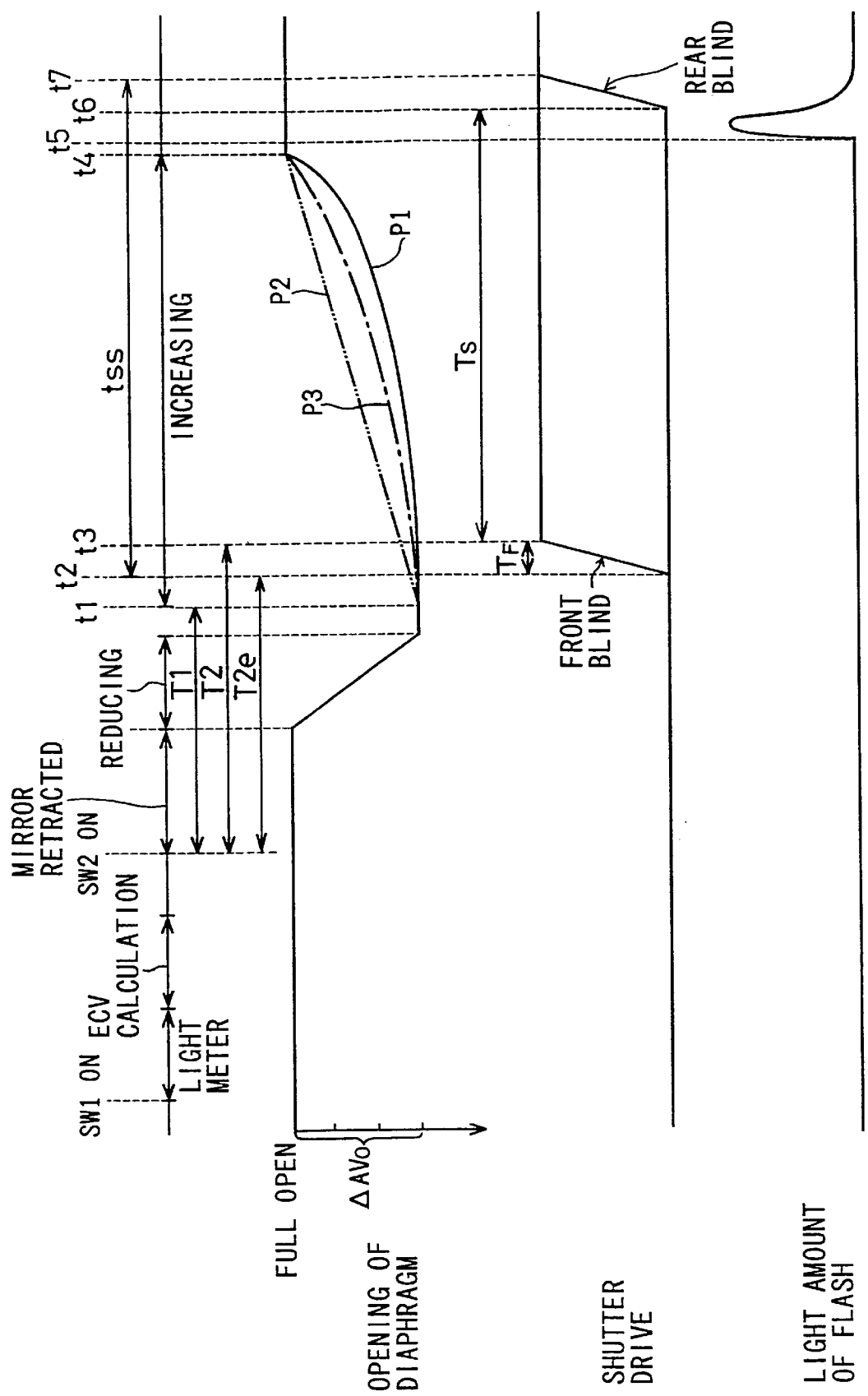

Next, operations of the diaphragm 7, the shutter 22 and the flash 36 in the apodization mode are described with reference to FIGS. 1 and 2. FIG. 2 is a timing chart showing operative states of the diaphragm 7, the shutter 22 and the flash 36. In FIG. 2, indicated at t1 is a time when opening of the diaphragm 7 is started; t2 is a time when opening of the shutter 22 is started; t3 is a time when the shutter 22 is fully opened; t4 is a time when the diaphragm 7 is fully opened; t5 is a time when the flash 36 is fired; t6 is a time when the full opening of the shutter 22 ends; and t7 is a time when opening of the shutter 22 ends or the exposure ends.

(1) Possibility of effecting the apodization mode:

In the apodization mode, after the opening of the diaphragm 7 is reduced by the set stop-down value $\Delta AV_0$ from its fully opened state, it is started to open the diaphragm 7. The diaphragm 7 is gradually opened during the exposure of the film with the shutter 22 being opened. For example, the stop-down value $\Delta AV_0$ from the full open F-number of the diaphragm 7 in the apodization mode is set at 3 in AV stops. Since the full open F-number is 2.8 in this embodiment, the diaphragm 7 is gradually opened after the opening thereof is reduced to the extent that the F-number=about 8. Thus, the light amount is reduced along a direction perpendicular to the optical axis away from the center of the optical axis. As a result, the apodization effect can be obtained.

Accordingly, the apodization effect can be obtained in a most satisfactory manner if the diaphragm 7 is operated close to the full open F-number. Further, a satisfactory apodization effect cannot be obtained unless the full open F-number of the diaphragm 7 is small to a certain degree, i.e., unless the lens optical system is bright.

Therefore, the body microcomputer 33 determines that the lens is capable of performing the photographing in the apodization mode if the full open F-number of the diaphragm 7 of the lens unit L mounted on the body unit B is 4 or smaller.

On the other hand, if the diaphragm 7 is operated near the full open F-number, the obtained shutter speed $T_S$ is a small value in the case that the object is detected to be bright by the light meter 26. In this case, if the shutter speed $T_S$ becomes smaller than $T_{SO}$ which is a time required to open the diaphragm 7 by $\Delta AV_0=3$, it is impossible to fully open the diaphragm 7 to the full open F-number within the shutter speed $T_S$.

Accordingly, the time $T_{SO}$ is set as a reference shutter speed $T_{SO}$ and the body microcomputer 33 determines that the photographing in the apodization mode is impossible in the case that the obtained shutter speed $T_S$ is smaller than $T_{SO}$ ($T_S<T_{SO}$) even if the exposure mode is set at the apodization mode by the exposure mode setter 61. The body microcomputer 33 then causes the warning display on the viewfinder display 28 to notify the photographer that the photographing in the apodization mode is impossible and prohibits receiving an instruction to turn the release switch SW2 on.

When the photographing in the apodization mode is discriminated to be impossible, the following control ① or ② may be performed.

① A variable range of the diaphragm opening is limited by changing the stop-down value $\Delta AV_0$ to 2, thereby making it possible to fully open the diaphragm 7 to the full open F-number within the shutter speed $T_S$ to perform the photographing.

② The diaphragm 7 is not fully opened to the full open F-number, but to the F-number of 4 while the stop-down value $\Delta AV_0$ is held at 3. In this way, the variable range of the diaphragm opening is limited to enable the photographing.

Although these controls result in a slightly reduced apodization effect, the photographing in the apodization mode can be performed.

Further, a blind travel time $T_F$ which is a time required for the front blind 221 and the rear blind 222 to travel from one end to the other end is a value peculiar to the camera, and is stored in the ROM 72 of the body microcomputer 33.

The influence of the travel of the blinds becomes larger as the opening of the diaphragm 7 increases in the case that the shutter speed $T_S$ is smaller than $4T_F$ ($T_S<4T_F$). Accordingly, in this case, $T_{SO}=4T_F$ may be set. Further, $T_{SO}$ may be, for example, set at 1/125 (sec.).

② Opening control of the diaphragm 7:

The ROM 81 (see FIG. 1) stores change control curves as shown in FIG. 2 according to which a changing rate of the exposure index (AV stops) increases while the diaphragm 7 is being opened in correspondence with respective shutter speeds $T_S$ such as 1/125 (sec.) and 1/60 (sec.). The diaphragm controller 82 (see FIG. 1) selects a change control curve corresponding to the shutter speed $T_S$ obtained by the exposure calculator (see FIG. 1), and controls the opening of the diaphragm 7 in accordance with the selected change control curve. Therefore, the light amount is reduced toward the outside in the peripheral portion.

Here, the predetermined time T2 is determined based on the shutter speed $T_S$ such that the shutter 22 is fully opened later than the time t4 at which the diaphragm 7 is fully opened in accordance with the respective change control curves, i.e., ($t3+T_S$)>t4.

The opening manner of the diaphragm 7 may be controlled in the following manners ① to ⑨.

① In the ROM 81 is stored such a change pattern that the changing rate of the exposure index (AV units) increases in the process of opening the diaphragm 7. The diaphragm controller 82 generates the change control curve P1, which is shown in solid line in FIG. 2, corresponding to the shutter speed $T_S$ obtained by the exposure calculator 73 based on the change pattern, and controls the opening of the diaphragm 7 in accordance with the generated change control curve P1.

② In the ROM 81 is stored such a change pattern that the changing rate of the exposure index (AV units) is constant while the diaphragm 7 is being opened. The diaphragm controller 82 generates the change control curve P2 which is shown in chain double-dashed line in FIG. 2, corresponding to the shutter speed $T_S$ based on the change pattern, and controls the opening of the diaphragm 7 in accordance with the generated change control curve P2.

③ In the ROM 81 is stored an intermediate change pattern of the change patterns ①, ②. The diaphragm controller 82 generates the change control curve P3 which is shown in chain line in FIG. 2, corresponding to the shutter speed $T_S$ based on the change pattern, and controls the opening of the diaphragm 7 in accordance with the generated change control curve P3.

④ In FIG. 1, the change patterns ① to ③ are stored in the ROM 81, and the operation device 32 is provided, as shown in chain line, with a change pattern selector 63 for selecting any one of the change patterns. The body microcomputer 33 discriminates the selected change pattern and sends the discriminated change pattern to the lens microcomputer 12. The diaphragm controller 82 generates a change control curve corresponding to the shutter speed $T_S$ based on the selected change pattern and controls the opening of the diaphragm 7 in accordance with the generated change control curve.

⑤ In FIG. 1, the operation device 32 is provided, as shown in chain line, with the exposure setter 64 for changing the stop-down value $\Delta AV_0$ used when the apodization mode is set. The body microcomputer 33 discriminates the set stop-down value $\Delta AV_0$ and sends the discriminated stop-down value $\Delta AV_0$ to the lens microcomputer 12. The diaphragm controller 82 controls the opening of the diaphragm 7 after reducing it by the set stop-down value $\Delta AV_0$. For example, if $\Delta AV_0=4$, after being reduced to the F-number=8, the opening of the diaphragm 7 is controlled.

According to this embodiment, the stop-down value $\Delta AV_0$ can changeably be set according to the moving speed of the object in the case that the object is, for example, moving. Thus, the shutter speed and the aperture value of the diaphragm 7 can be controlled according to the moving speed of the object.

Further, in this embodiment, the stop-down value $\Delta AV_0$ may be set slightly larger by the exposure setter 64, and the photographing in the apodization mode may be performed without the diaphragm 7 being fully opened to the full open F-number during the exposure. Even in such a case, the apodization effect can be obtained.

⑥ The predetermined time T2 may be set such that the full opening of the shutter 22 ends at the time t4 at which the diaphragm 7 is fully opened in accordance with the respective change control curves P1, i.e., $(t3+T_S)=t4$.

⑦ In FIG. 1, first and second change control curves according to which the opening speed of the diaphragm 7 accelerates are stored in the ROM 81. The exposure calculator 73 compares the obtained shutter speed $T_S$ with a second reference shutter speed $T_{S10}$ (e.g., $T_{S10}=1/15$ sec.). The first change control curve is selected if $T_S<T_{S10}$, whereas the second change control curve is selected if $T_S \geq T_{S10}$. The diaphragm controller 82 controls the opening of the diaphragm 7 in accordance with the selected change control curve.

Here, the first change control curve is set such that the diaphragm 7 is opened based on the reference shutter speed $T_{S0}$, whereas the second change control curve is set such that the diaphragm 7 is opened based on the second reference shutter speed $T_{S10}$. Accordingly, the diaphragm 7 is fully opened to the full open F-number during the shutter speed in the respective cases.

⑧ In FIG. 1, the diaphragm controller 82 changeably sets the stop-down value $\Delta AV_0$ according to the full open F-number of the lens optical system stored in the ROM 81. For example, $\Delta AV_0=3$ if the full open F-number$\leq 2.8$, and $\Delta AV_0=2$ if the full open F-number$\geq 4$. In this way, by increasing the change amount of the diaphragm 7 in the case of a bright lens optical system while reducing it in the case of a dark lens optical system, the diaphragm 7 can be controlled in a manner suited to the lens optical system.

⑨ In FIG. 1, the operation device 32 is provided, as shown in chain line, with the exposure setter 64 for changeably setting the stop-down value $\Delta AV_0$ used when the apodization mode is set. The body microcomputer 33 discriminates the set stop-down value $\Delta AV_0$ and sends it to the lens microcomputer 12. The diaphragm controller 82 increases the opening speed of the diaphragm 7 when the set stop-down value $\Delta AV_0$ is large while reducing it when the set stop-down value $\Delta AV_0$ is small.

According to this embodiment, a desired degree of the apodization effect can be obtained by changeably setting the stop-down value $\Delta AV_0$, and the diaphragm 7 can be fully opened to the full open F-number within the shutter speed regardless of the extent of the stop-down value $\Delta AV_0$.

③ Firing timing of the flash 36:

The flash controller 75 (see FIG. 1) starts the firing of the flash 36 at the time t5 as shown in FIG. 2 so that a maximum light amount is reached immediately before the end time (t6) of the full opening of the shutter 22 using the obtained shutter speed $T_S$.

The flash controller 75 may control the firing of the flash 36 at the following times ① to ④.

① The firing of the flash 36 is started simultaneously with the time t4 at which the diaphragm 7 is fully opened in accordance with the change control curve, i.e., by setting t5=t4.

② The firing of the flash 36 is started between the time t4 at which the diaphragm 7 is fully opened in accordance with the change control curve and the end time (t6) of the full opening of the shutter 22.

By these controls, the light amount of the flash 36 can be securely made maximum when the diaphragm 7 is fully opened.

③ In FIG. 1, the flash setter 62 has a time setting function of arbitrarily setting a firing time of the flash 36. The flash controller 75 causes the flash 36 to be fired at the time set by the flash setter 62.

④ The camera is provided at a appropriate position with a signal receiver for receiving a signal of commanding flash fire sent from a separate signal emitter. The flash controller 75 causes the flash 36 to be fired in responsive to a received flash fire signal.

By these controls, the flash 36 can be fired at a desired time according to the object.

Figure 3:
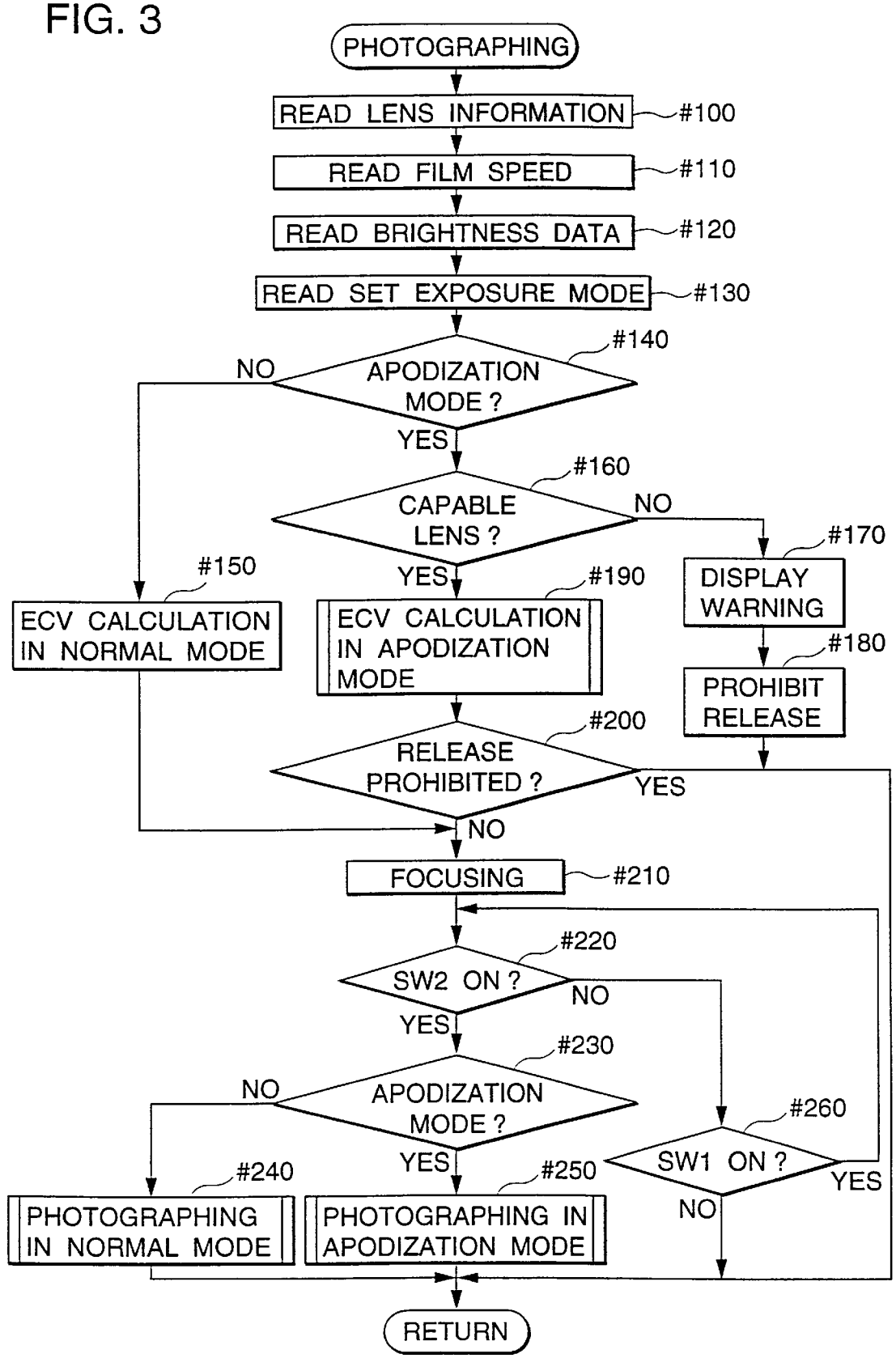
FIG. 3 is a flowchart showing a main routine of photographing procedure of the camera.
Figure 4:
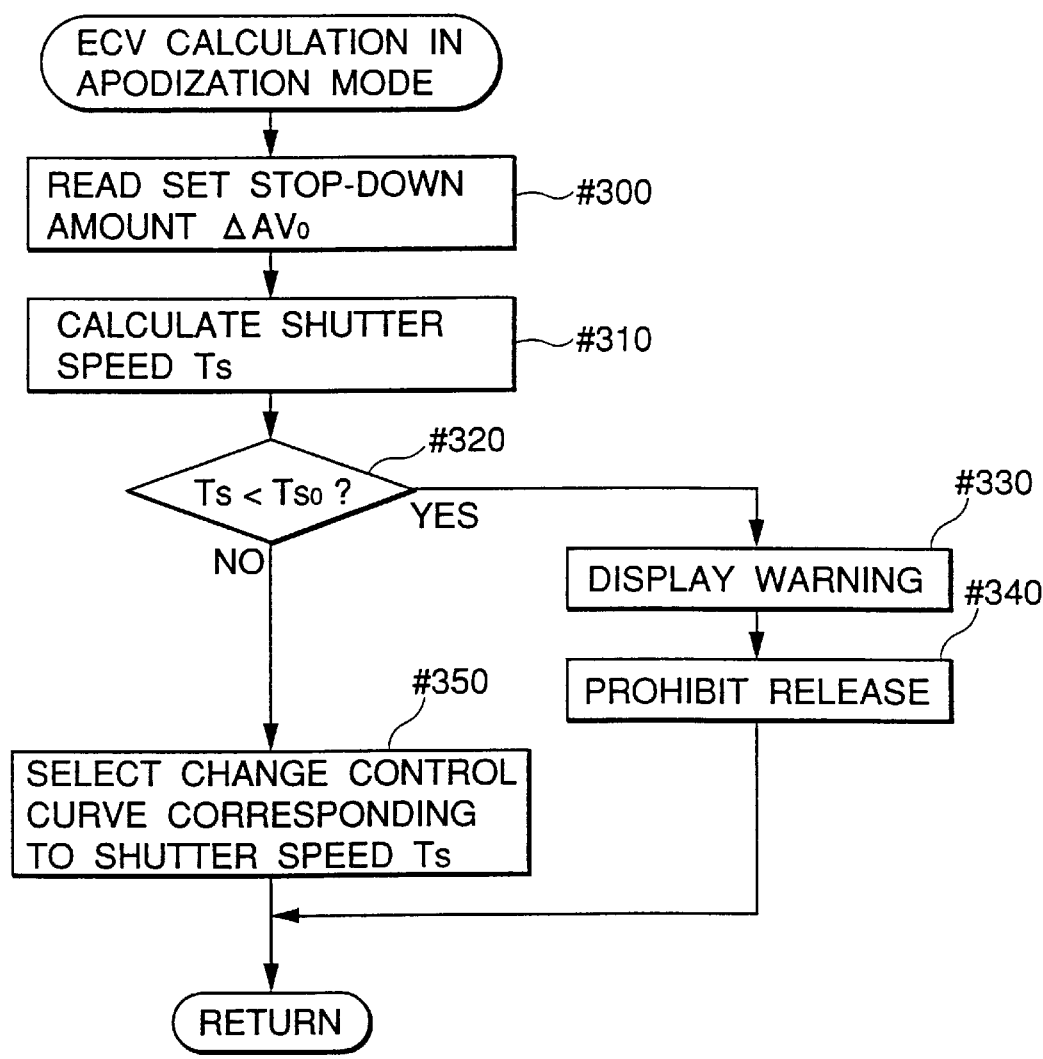
FIG. 4 is a flowchart showing a subroutine "Exposure Control Value Calculation in Apodization Mode" executed in a step of the main routine shown in FIG. 3.
Figure 5:
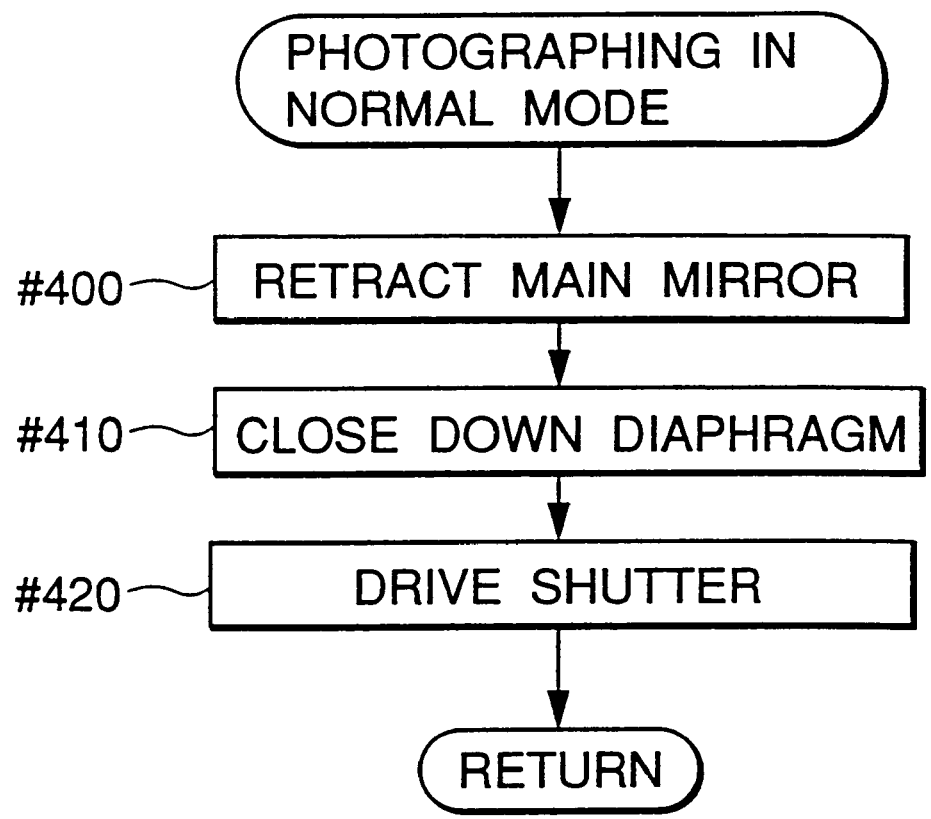
FIG. 5 is a flowchart showing a subroutine "Photographing in Normal Mode" executed in a step of the main routine shown in FIG. 3.
Figure 6:
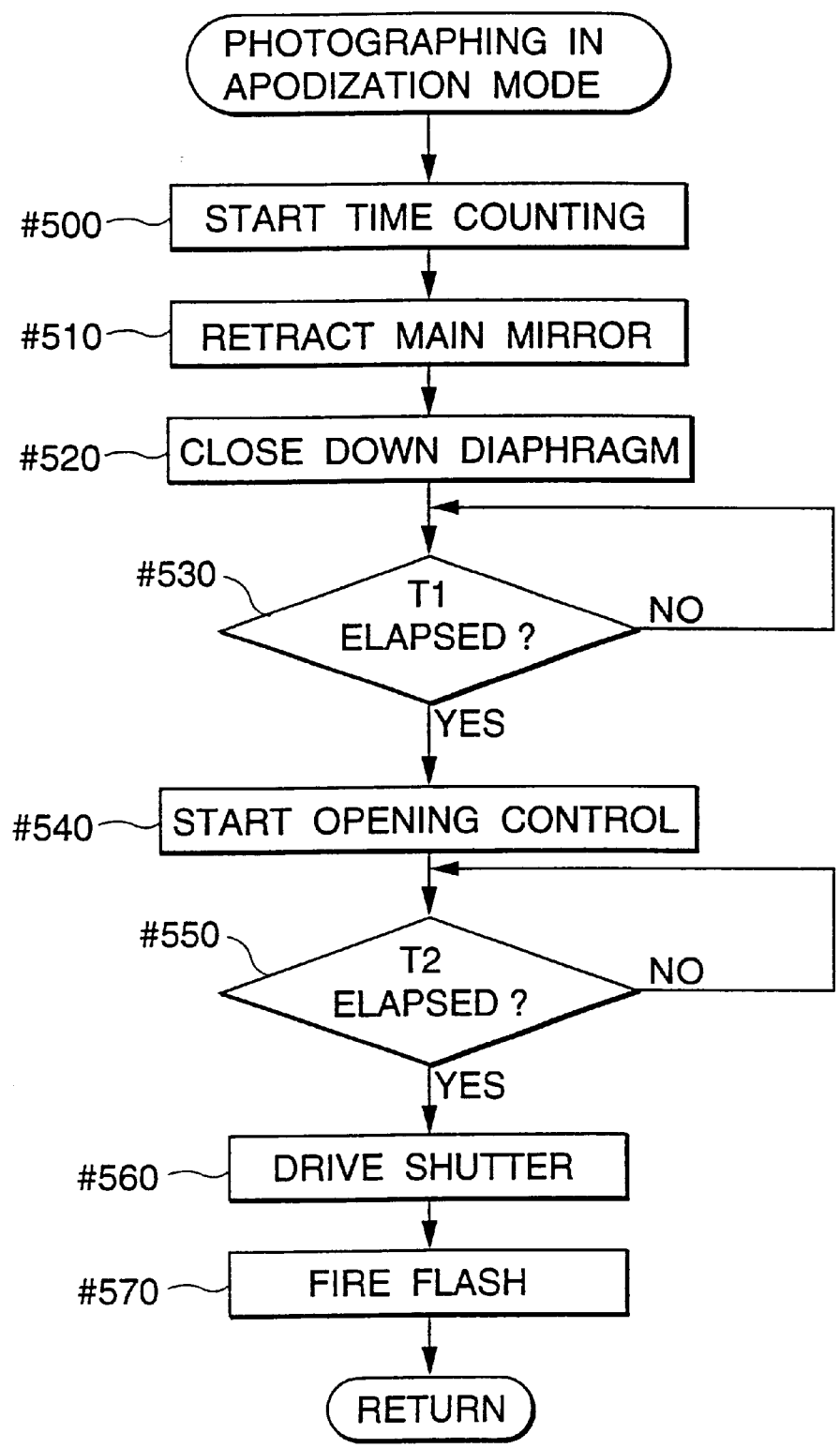
FIG. 6 is a flowchart showing a subroutine "Photographing in Apodization Mode" executed in a step of the main routine shown in FIG. 3.

Next, photographing operation is described with reference to FIGS. 3 to 6. FIG. 3 is a flowchart showing a photographing procedure, and FIGS. 4 to 6 are flowcharts showing subroutines executed in the main routine of FIG. 3.

In the body microcomputer (see FIG. 1), when it is discriminated that the preparatory switch SW1 has been turned on, the photographing operation is started by entering a routine shown by the flowchart of FIG. 3. At this time, the diaphragm 7 is held fully open as shown in FIG. 2.

In FIG. 3, lens information is first read (Step #100), a film speed is read (Step #110), a light measurement value, i.e., a brightness data of an object is read (Step #120), and the set exposure mode is read (Step #130).

Subsequently, it is discriminated whether the set exposure mode is the apodization mode (Step #140). If the apodization mode is not set (NO in Step #140), an exposure control value in the normal mode, i.e., the number of stops by which the diaphragm opening is to be reduced is calculated using the light measurement value obtained in Step #120, and this number of stops is added to the full open F-number sent from the lens microcomputer 12 to calculate a control F-number, which is then sent to the lens microcomputer 12 (Step #150). Thereafter, Step #210 follows.

On the other hand, if the set exposure mode is the apodization mode (YES in Step #140), it is discriminated whether the lens of the lens unit L is capable of performing the photographing in the apodization mode (Step #160). If the lens is incapable (NO in Step #160), a warning is displayed on the viewfinder display 28 (Step #170), the reception of an instruction to turn the release switch SW2 on is prohibited (Step #180), and this routine ends.

On the other hand, if the photographing in the apodization mode is possible in Step #160 (YES in Step #160), a subroutine "Exposure Control Value Calculation in Apodization Mode" to be described later is entered (Step #190).

Next, it is discriminated whether the reception of the insulation to turn the release switch SW2 on has been prohibited in the subroutine of Step #190 (Step #200). If it is prohibited (YES in Step #200), this routine ends. Unless otherwise (NO in Step #200), a defocus amount is calculated using an output of the distance meter 26; a data of the drive amount of the focusing motor 10 is sent to the lens microcomputer 12, and the focusing is performed by controlling the driving of the focusing motor 10 by the lens microcomputer 12 (Step #210).

It is then discriminated whether the release switch SW2 is on (Step #220). If the release switch SW2 is on (YES in Step #220), it is further discriminated whether the set exposure mode is the apodization mode (Step #230). Unless the apodization mode is set (NO in step 230), this routine ends, entering a subroutine "Photographing in Normal Mode" to be described later (Step #240). On the other hand, if the apodization mode is set (YES in Step #230), this routine ends, entering a subroutine "Photographing in Apodization Mode" to be described later (Step #250).

If, on the other hand, the release switch SW2 is off (NO in Step #220), it is discriminated whether the preparatory switch SW1 is on (Step #260). This routine returns to Step #220 if the preparatory switch SW1 is on (YES in Step #260) while ending if the preparatory switch SW1 is off (NO in Step #260).

FIG. 4 is a flowchart showing the subroutine "Exposure Control Value Calculation in Apodization Mode" executed in Step #190 of FIG. 3.

First, a set stop-down value $\Delta AV_0$ of the diaphragm 7 is read (Step #300). A shutter speed $T_S$ is calculated using the set stop-down value $\Delta AV_0$ and the light measurement value obtained in Step #120, and a predetermined time T2 is determined based on the shutter speed $T_S$ (Step #310).

Subsequently, the obtained shutter speed $T_S$ and the reference shutter speed $T_{S0}$ are compared (Step #320). If $T_S<T_{S0}$ (YES in Step #320), a warning is displayed on the viewfinder display 28 upon the judgment that the photographing in the apodization mode is impossible (Step #330), the reception of the instruction to turn the release switch SW2 on is prohibited (Step #340) and this subroutine ends.

On the other hand, if $T_S \geq T_{S0}$ (NO in Step #320), the change control curve of the diaphragm 7 corresponding to the shutter speed $T_S$ is selected (Step #350) and this subroutine ends.

FIG. 5 is a flowchart showing the subroutine "Photographing in Normal Mode" executed in Step #240 of FIG. 3.

First, the main mirror 21 is retracted (Step #400), the diaphragm 7 is closed down to the control F-number calculated in Step #150 (Step #410), and the shutter 22 is driven with the diaphragm 7 closed down, thereby exposing the film to light (Step #420).

FIG. 6 is a flowchart showing the subroutine "Photographing in Apodization mode" executed in Step #250 of FIG. 3.

First, the counting of an elapse of time is started (Step #500), the main mirror 21 is retracted (Step #510), and the diaphragm 7 is closed down by the set stop-down value $\Delta AV_0$ (Step #520).

Subsequently, it is discriminated whether the elapse of time being counted has reached the predetermined time T1 (Step #530). This routine waits until the predetermined time T1 elapses (NO in Step #530). Upon the elapse of the predetermined time T1 (YES in Step #530), the opening control of the diaphragm 7 is started (Step #540, t1 in FIG. 2). This opening control is performed in accordance with the change control curve selected in Step #350.

It is then discriminated whether the elapse of time being counted has reached the predetermined time T2 (Step #550). This routine waits until the predetermined time T2 elapses (NO in Step #550). Upon the elapse of the predetermined time T2 (YES in Step #550), the shutter 22 reaches the full opening to start exposing the film (Step #560, t3 in FIG. 2). Subsequently, the flash 36 is fired immediately before the end of the full opening of the shutter 22 (Step #570, t5 in FIG. 2).

Figure 11:
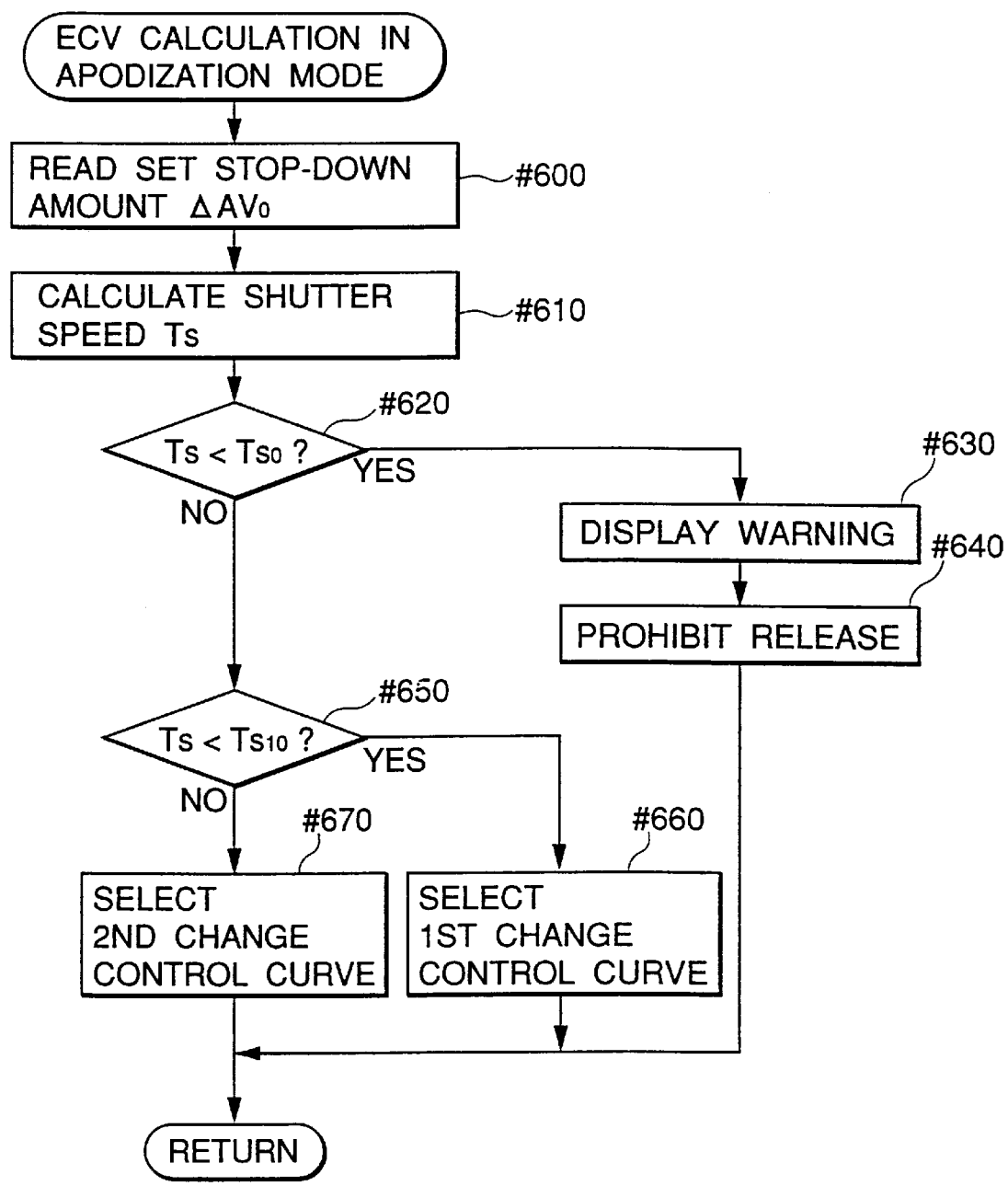
FIG. 11 is a flowchart showing another subroutine "Exposure Control Value Calculation in Apodization Mode" executed in a step of the main routine shown in FIG. 3.

The exposure control value calculation in the apodization mode in Step #190 of FIG. 3 may be performed in accordance with a procedure shown in FIG. 11 instead of the one shown in FIG. 4. FIG. 11 is a flowchart showing a procedure of the subroutine "Exposure Control Value Calculation in Apodization Mode" executed in Step #190 of FIG. 3 in the case ⑦ of the above "② Opening Control of the Diaphragm 7".

No description is given on Steps #600 to #640 since they are the same as Steps #300 to #340 of FIG. 4. In Step #620, if $T_S \geq T_{S0}$ (NO in Step #620), the shutter speed $T_S$ and the second reference shutter speed $T_{S10}$ are compared (Step #650). If $T_S<T_{S10}$ (YES in Step #650), the first change control curve is selected (Step #660). If $T_S \geq T_{S10}$ (NO in Step #650), the second change control curve is selected (Step #670).

As described above, according to this embodiment, the diaphragm 7 and the shutter 22 are provided and the opening area of the diaphragm 7 is changed while the shutter 22 is fully opened to expose the film. Therefore, the apodization effect, i.e., a picture beautifully blurred and free from double line blurredness can be obtained by reducing the amount of light in the peripheral portion.

However, it may be appreciated to carry out the opening of the diaphragm 7 in accordance with a control curve based on the exposure time $T_{SS}$ between the time t2 when the opening of the shutter 22 starts and the time t7 when the opening of the shutter 22 ends.

In this case, the diaphragm controller 82 selects a change control curve corresponding to the exposure time $T_{SS}$ obtained by the exposure calculator, and controls the opening of the diaphragm 7 in accordance with the selected change control curve. The predetermined time T2e is determined based on the exposure time $T_{SS}$ such that the shutter 22 is opened later than the time t4 at which the diaphragm 7 is fully opened in accordance with the respective change control curves, i.e., $(t2+T_{SS})>t4$. The opening of the diaphragm 7 is controlled in similar ways to those mentioned in the control based on the shutter speed $T_S$.

Figure 12:
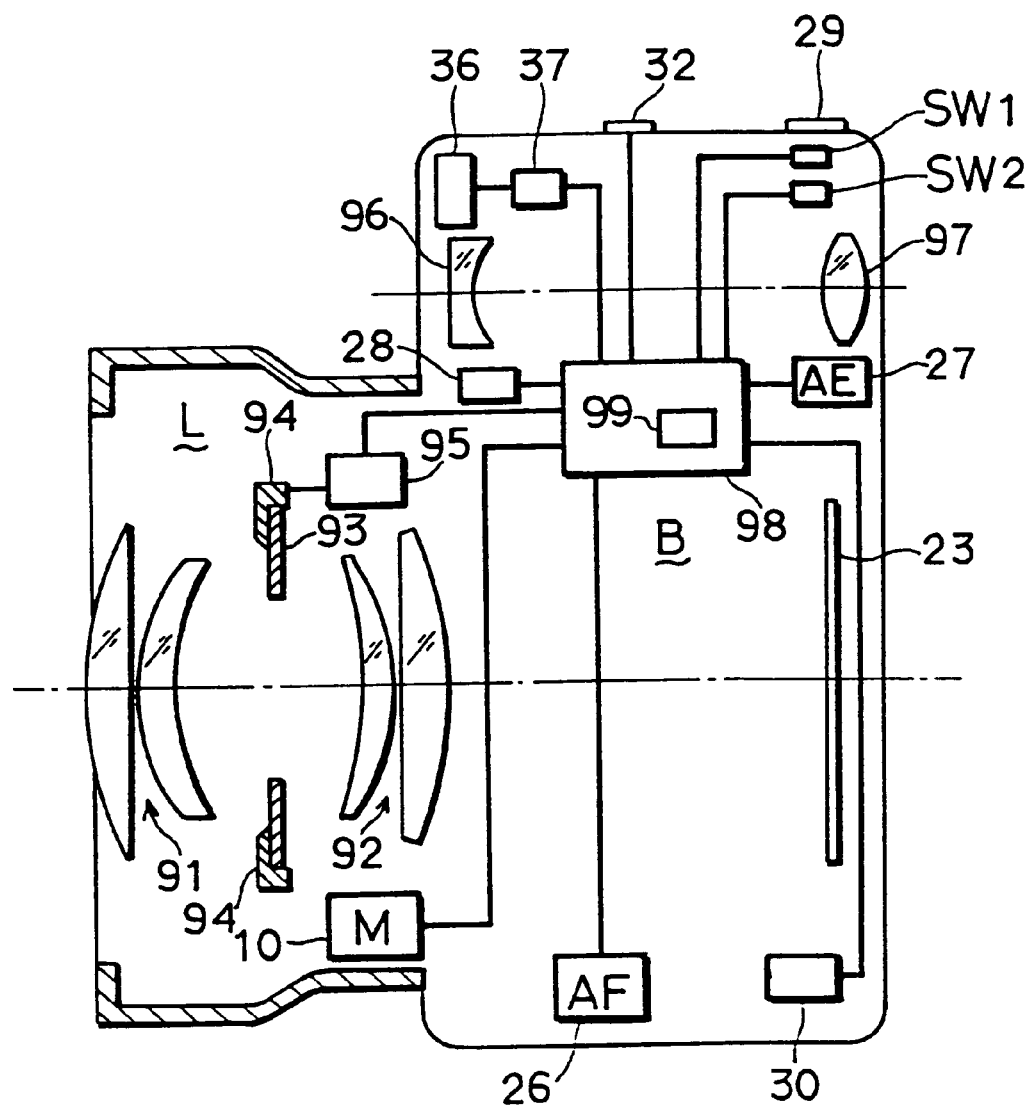
FIG. 12 is a schematic diagram showing an internal construction of a second camera embodying the present invention.

FIG. 12 is a schematic internal construction of a second camera embodying the invention. It should be noted that no description is given to the elements having the same functions as those of FIG. 7 by identifying them by the same reference numerals.

In this camera, the lens unit L and the body unit B are integrally constructed as shown in FIG. 12. The lens unit L is comprised of a lens group 91 carried on an unillustrated first movable frame, a lens group 92 carried on an unillustrated second movable frame, a lens shutter 93, a support frame 94 for supporting the lens shutter 93, a focusing motor 10, and a shutter driver 95 for driving the lens shutter 93.

On the other hand, the body unit B is comprised of a film 23 provided on an optical axis of the lens unit L, a viewfinder optical system including an objective lens 96 and an eyepiece lens 97 arranged on the same optical axis in an upper portion, a distance meter 26, a light meter 27, a viewfinder display 28, a shutter release button 29, a preparatory switch SW1, a release switch SW2, a film speed reader 30, an operation device 32, and a camera microcomputer 98 for controlling the above respective elements. Further, a flash 36 and a flash firing circuit 37 are provided in an upper end of the body unit B.

The body unit B is constructed such that a part of light incident on the film 23 is incident on the light meter 27.

With this construction, when the focusing motor 10 is rotated during the focusing, the first and second movable frames are moved, thereby independently projecting the lens groups 91, 92 to attain an in-focus condition.

The shutter driver 95 is made of an electromagnet, spring or the like, and opens and closes the lens shutter 93 in accordance with the set exposure mode: apodization mode or normal mode.

The camera microcomputer 98 substantially has the functions of the body microcomputer 33 and the lens microcomputer 12 in FIG. 1 showing the first embodiment. A difference is that the opening and closing of the lens shutter 93 are controlled as described later by controllably driving the shutter driver 95 instead of the functions of the diaphragm controller 82 and the shutter controller 74.

The camera microcomputer 98 also has a built-in ROM 99, in which data such as a set F-number $F_0$ and a reference exposure time $T_{SS_1}$ to be described later are stored.

Figure 13A:
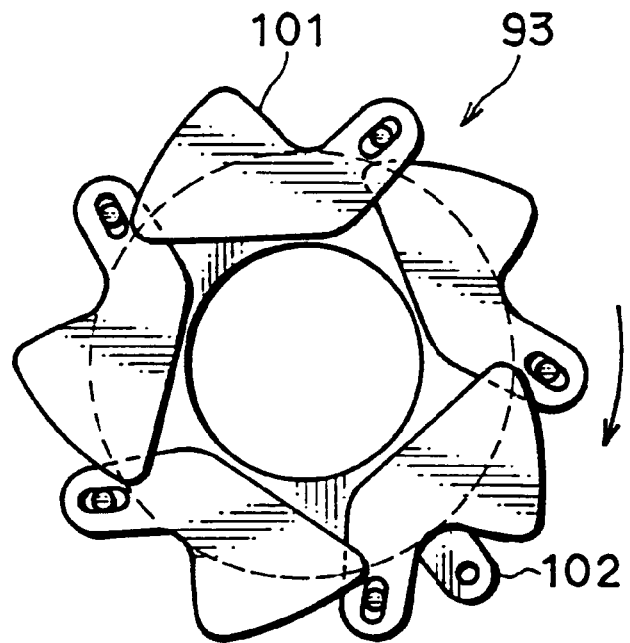
FIGS. 13A and 13B are schematic construction diagrams of a lens shutter in its open state and closed state, respectively.
Figure 13B:
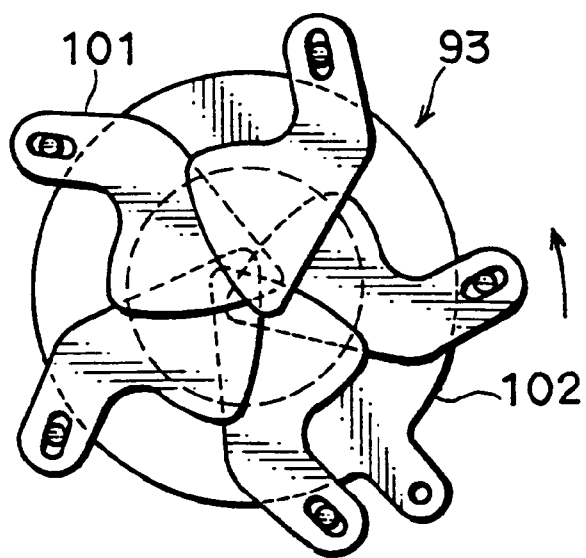

FIGS. 13A and 13B are schematic construction diagrams of the lens shutter 93 in its open and closed states, respectively.

The lens shutter 93 acts as a diaphragm and a shutter, and is comprised of five sector blades 101, a sector ring 102, etc. as shown in FIG. 13. Each sector blade 101 has an oblong hole formed at one end thereof and a round hole formed substantially in the middle thereof. The sector blades 101 are supported by fitting pins secured to the camera main body into the oblong holes and fitting pins secured to the sector ring 102 into the round holes.

The sector ring 102 is arranged such that its center coincides with the optical axis, is rotatably supported about the optical axis, and is rotated by the shutter driver 95 (FIG. 12).

With this construction, when the sector ring 102 is rotated clockwise in FIG. 13A, the opening area of the lens shutter 93 becomes smaller. If the sector ring is rotated counterclockwise in FIG. 13B, the opening area of the lens shutter 93 becomes larger.

Figure 14:
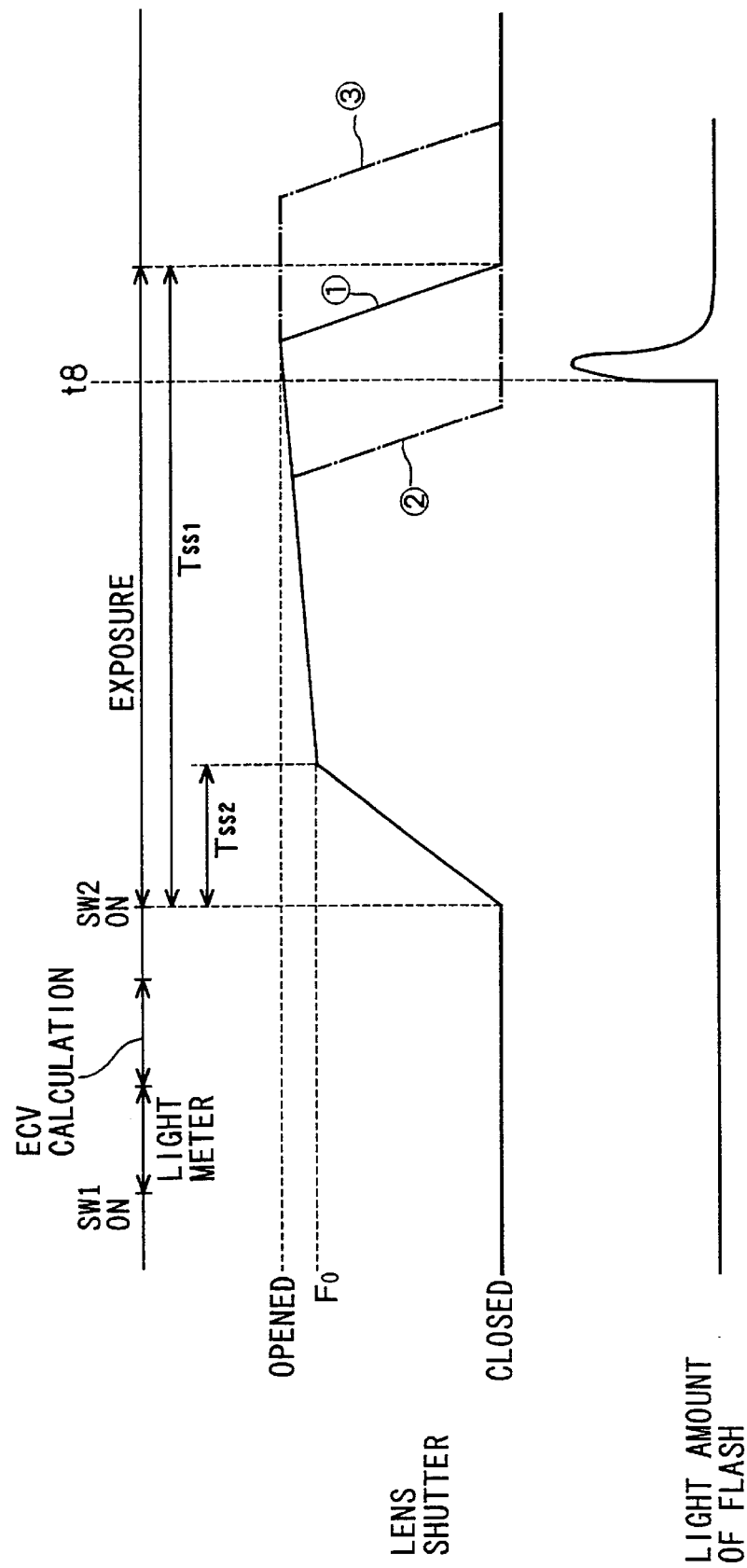
FIG. 14 is a timing chart showing operative states of a lens shutter and a flash of the second camera.

Next, the operation of the second embodiment is described with reference to FIG. 14. FIG. 14 is a timing chart showing a photographing procedure in the second embodiment and the operative states of the lens shutter 93 and the flash 36.

(1) Photographing Operation:

An exposure time $T_{SS_1}$ of the film and an opening area of the lens shutter 93 are calculated using the light measurement value obtained by the light meter 27 (see FIG. 12). Similar to the first embodiment, when the preparatory switch SW1 is turned on, the light measurement value is obtained and the exposure calculation is performed using this light measurement value. When the release switch SW2 is turned on, the film is exposed.

If the exposure mode set by the operation device 32 (see FIG. 12) is the normal mode, the F-number and an exposure time corresponding to the light measurement value are calculated. The lens shutter 93 is so controlled as to open to the obtained F-number and to close at the obtained shutter speed.

On the other hand, if the set exposure mode is the apodization mode, the lens shutter 93 is gradually opened at a constant speed after being opened to the set F-number $F_0$. Accordingly, the exposure time $T_{SS_1}$ which differs depending on the light measurement value is calculated.

The opening and closing of the lens shutter 93 are controlled in the following manners ① to ③.

① If a calculated exposure time $T_{SS}=T_{SS_1}$, the closing of the lens shutter 93 is started substantially at the same time when the lens shutter 93 is fully opened to the full open F-number (① in FIG. 14).

In this way, the apodization effect can be obtained since the amount of light in the peripheral portion is reduced.

② If a calculated shutter speed $T_{SS}<T_{SS_1}$, the closing of the lens shutter 93 is started before the lens shutter 93 is fully opened to the full open F-number (② in FIG. 14).

In this way, the apodization effect can be obtained, though to a slightly less degree because the range of the peripheral portion where the amount of light is reduced is slightly reduced.

③ if a calculated exposure time $T_{SS}>T_{SS_1}$, the closing of the lens shutter 93 is started after the lens shutter 93 is fully opened to the full open F-number ((③ in FIG. 14).

In this way, the apodization effect can be obtained since the amount of light in the peripheral portion is reduced.

(2) Possibility of the Apodization Mode:

In the apodization mode, the lens shutter 93 is gradually opened at a constant speed after being opened to the set F-number $F_0$ from its light cut-off (closed) state. Since this reduces the amount of light in the peripheral portion, the apodization effect can be obtained. Accordingly, the lens shutter 93 is opened close to the full open F-number in the apodization mode. Thus, a calculated exposure time $T_{SS}$ is a small value if the object is detected to be bright by the light meter 26.

In this case, assuming that $T_{SS_2}$ denotes a time required for the lens shutter 93 to be opened to the set F-number $F_0$ from the closed state as shown in FIG. 14, the lens shutter 93 cannot be opened any further than the set F-number $F_0$ in a range of $T_{SS} \leq T_{SS_2}$.

Accordingly, even if the exposure mode is set at the apodization mode, a warning that the photographing in the apodization mode is impossible is displayed on the viewfinder display 28 and the reception of an instruction to turn the release switch SW2 (see FIG. 12) on is prohibited in the case that the exposure time $T_{SS}$ obtained as a result of the exposure calculation is: $T_{SS} \leq T_{SS_2}$.

In the case that $T_{SS} \leq T_{SS_2}$, the photographing operation may be continued after displaying the warning that the photographing in the apodization mode is impossible on the viewfinder display 28.

(3) Firing Timing of the Flash Lamp 36:

The camera microcomputer 98 (see FIG. 12) causes the firing of the flash 36 to be started at the time t8 using the obtained exposure time $T_{SS}$, so that a maximum light amount is reached when the opening area of the lens shutter 93 is at maximum immediately before the end of the exposure as shown in FIG. 14.

It should be noted that, in FIG. 12, the operation device 32 may have a time setting function of arbitrarily setting a firing time of the flash 36 and the camera microcomputer 98 may cause the flash 36 to be fired at a time set by the operation device 32. This enables the flash 36 to be fired at a desired time according to the object.

Further, it may be appreciated that the camera is provided at a appropriate position with a signal receiver for receiving a signal of commanding flash fire sent from a separate signal emitter, and the camera microcomputer 98 causes the flash 36 to be fired in responsive to a received flash fire signal.

The present invention is not limited to the foregoing embodiments, but may be embodied in the following manners (1) and (2).

(1) As shown in broken line in FIG. 7, a photodetector 38 for sensing the light reflected by the film 23 may be provided.

During the photographing, the main mirror 21 is retracted upward and a light having passed through the lens optical system reaches the film 23, exposing it. However, the light measurement by the light meter 27 cannot be performed during the exposure since the light is not incident on the viewfinder optical system due to the retracted main mirror 21.

Contrary to this, according to this manner (1), the light reflected by the film 23 can be detected by the photodetector 38. Accordingly, an exposure control corresponding to a light amount variation during the exposure, e.g., a TTL control for controlling the amount of light emitted from the flash 36 in real time while measuring the light reflected by the film 23 may be performed.

(2) The warning that the photographing in the apodization mode is impossible may be audibly given using a sound generator or a buzzer instead of the display on the viewfinder display 28.

As described above, a changing manner of changing the opening area of the diaphragm is set and the opening area of the diaphragm is changed in accordance with the set changing manner while the shutter is open. Accordingly, the amount of light passing the center of the lens optical system and the amount of light passing the peripheral portion of the lens optical system can be differed, with the result that the apodization effect can be obtained.

Further, a shutter speed is set and a changing manner of changing the opening area of the diaphragm is set using the set shutter speed. By setting such that the opening of the diaphragm is changed, for example, within the shutter opening time which is determined by the shutter speed, the amount of light passing the center of the lens optical system and the amount of light passing the peripheral portion of the lens optical system can securely be differed, with the result that the apodization effect can be obtained.

Furthermore, by setting a changing manner of changing the opening area of the diaphragm using the full open F-number of the lens optical system, the diaphragm can be controlled in a manner suited to the lens optical system.

Further, an exposure time of the film is set and a changing manner of changing the opening area of the diaphragm is set using the set exposure time. For example, by setting such that the opening area of the diaphragm is changed within the exposure time, the amount of light passing the center of the lens optical system and the amount of light passing the peripheral portion of the lens optical system can securely be differed, with the result that the apodization effect can be obtained.

Furthermore, a stop-down value of the diaphragm is set and a changing manner of changing the opening area of the diaphragm is set using the set stop-down value. For example, by setting such that the changing rate of the opening area is increased as the set stop-down value is increased, the apodization effect of a desired degree can be obtained depending upon the set stop-down value.

Further, a change pattern of changing the opening area of the diaphragm is set and a changing manner of the opening area is set in accordance with the set change pattern. In this way, the changing manner can be set only by setting the change pattern, with the result that the changing manner, i.e., the change amount and the changing rate can easily be set.

Furthermore, a plurality of change patterns are stored and a change pattern is set by selecting one of the plurality of change patterns stored. Thus, the change pattern can be easily set only by selecting it. Also, a desired change pattern can be inputted, and can be thus easily set.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An exposure controller comprising:
   a diaphragm which has a changeable opening to adjust the amount of light reaching a photosensitive medium from a lens optical system;
   a shutter which is openable to permit the photosensitive medium to be exposed to light; and
   a control unit which changes the opening of the diaphragm during the time when the shutter is being opened.

2. An exposure controller according to claim 1, wherein the control unit reduces the opening of the diaphragm by a predetermined value, and thereafter increases the opening.

3. An exposure controller according to claim 2, wherein the control unit reduces the opening of the diaphragm before the shutter is opened.

4. An exposure controller according to claim 2, wherein the control unit increases the opening of the diaphragm by a nearly maximum value during the time when the shutter is being opened.

5. An exposure controller according to claim 1, wherein the control unit increases the rate of changing of the opening with time.

6. An exposure controller according to claim 1, wherein the control unit keeps the rate of changing of the opening constant.

7. An exposure controller according to claim 1, further comprising:
   a light meter which measures a brightness of an object; and
   a calculator which calculates an exposure time based a measured brightness.

8. An exposure controller according to claim 7, wherein the control unit suspends changing of the opening when a calculated exposure time is lower than a predetermined value.

9. An exposure controller according to claim 7, wherein the control unit changes the opening in a smaller range when a calculated exposure time is lower than a predetermined value than when a calculated exposure time is larger than the predetermined value.

10. An exposure controller according to claim 7, further comprising a warning device which provides a warning that a calculated exposure time is lower than a predetermined value.

11. An exposure controller according to claim 1, wherein the shutter includes a focal plane shutter having a front blind and a rear blind.

12. An exposure controller comprising:
    a diaphragm which has a changeable opening to adjust the amount of light reaching a photosensitive medium from a lens optical system;

a shutter which is openable to permit the photosensitive medium to be exposed to light;

a changing manner setter which sets a changing manner of changing the opening of the diaphragm; and a control unit which changes the opening of the diaphragm in accordance with a set changing manner during the time when the shutter is being opened.

13. An exposure controller according to claim 12, wherein the changing manner setter sets a changing manner in accordance with an opening time of the shutter.

14. An exposure controller according to claim 12, wherein the changing manner setter sets a changing manner in accordance with an open aperture value of the lens optical system.

15. An exposure controller according to claim 12, wherein the changing manner setter sets a changing manner in accordance with an exposure time.

16. An exposure controller according to claim 12, further comprising a change range setter which sets a change range in which the opening is changeable, wherein the changing manner setter sets a changing manner in accordance with a set change range.

17. An exposure controller according to claim 12, further comprising a change pattern setter which sets a change pattern of changing the opening, wherein the changing manner setter sets a changing manner in accordance with a set change pattern.

18. An exposure controller according to claim 17, wherein the change pattern setter includes a plurality of selective change patterns.

19. An exposure controller according to claim 17, wherein the change pattern setter includes a change pattern input unit of inputting a desired change pattern.

20. An exposure controller for use in a photographing apparatus including a flash, comprising:

a diaphragm which has a changeable opening to adjust the amount of light reaching a photosensitive medium from a lens optical system;

a shutter which is openable to permit the photosensitive medium to be exposed to light;

a diaphragm control unit which changes the opening of the diaphragm during the time when the shutter is being opened; and a flash control unit which fires the flash at a predetermined time during the time when the shutter is being opened.

21. An exposure controller according to claim 20, wherein the flash control unit fires the flash immediately before the shutter is closed.

22. An exposure controller according to claim 20, wherein the flash control unit fires the flash at a time when the opening of the diaphragm reaches a maximum value.

23. An exposure controller according to claim 20, wherein the flash control unit is responsive to an external signal of commanding flash fire to fires the flash.

24. An exposure controller according to claim 20, wherein the flash control unit includes a time setting portion of arbitrarily setting a firing time of the flash.

25. A photographing apparatus comprising:

a lens optical system which introduces light from an object to a photosensitive medium;

a diaphragm which has a changeable opening to adjust the amount of light reaching the photosensitive medium;

a shutter which is openable to permit the photosensitive medium to be exposed to light;

a control unit which changes the opening of the diaphragm during the time when the shutter is being opened.

26. A photographing apparatus according to claim 25, wherein the control unit includes a changing manner setter which sets a changing manner of changing the opening of the diaphragm.

27. A photographing apparatus according to claim 25, further comprising:

a flash; and a flash control unit which fires the flash at a predetermined time during the time when the shutter is being opened.

28. A photographing apparatus according to claim 27, wherein the flash control unit fires the flash immediately before the shutter is closed.

* * * * *